United States Patent
Ziegler et al.

(10) Patent No.: US 6,364,388 B1
(45) Date of Patent: Apr. 2, 2002

(54) AIR RETURN BULKHEAD FOR USE WITH A TRANSPORT TEMPERATURE CONTROL SYSTEM

(75) Inventors: David B. Ziegler, Eden Prairie; Verlin Wirth, Apple Valley; Jerry Kiesner, Milaca, all of MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 09/493,348

(22) Filed: Jan. 28, 2000

(51) Int. Cl.$^7$ .................................................. B60P 3/05
(52) U.S. Cl. .................... 296/24.1; 454/118; 454/88; 410/121; 410/129
(58) Field of Search ................... 296/24.1; 410/121, 410/129; 62/239, 441, 263, 297, 407; 454/118, 88

(56) References Cited

U.S. PATENT DOCUMENTS

| | | |
|---|---|---|
| 1,716,867 A | 6/1929 | Simms |
| 1,780,765 A | 11/1930 | O'Connor |
| 1,854,779 A * | 4/1932 | Brigham ..................... 410/129 |
| 2,119,905 A * | 6/1938 | Crawford .................... 454/118 |
| 2,133,722 A | 10/1938 | Sisson |
| 2,238,700 A | 4/1941 | Lundvall |
| 2,260,999 A | 10/1941 | Mann |
| 2,316,265 A | 4/1943 | Lundvall |
| 2,332,034 A * | 10/1943 | West ............................ 454/88 |
| 2,544,242 A | 3/1951 | Van Dorn et al. |
| 3,302,546 A * | 2/1967 | Rath ............................. 454/88 |
| 3,354,839 A | 11/1967 | Lich et al. |
| 3,680,492 A | 8/1972 | Weage |
| 3,762,341 A | 10/1973 | Adler |
| 4,049,311 A | 9/1977 | Dietrich et al. |
| 4,161,145 A | 7/1979 | Patterson, III |
| 4,358,233 A | 11/1982 | Morris et al. |
| 4,399,737 A * | 8/1983 | Severson ..................... 62/239 |
| 4,553,403 A * | 11/1985 | Taylor ......................... 454/118 |
| 4,639,031 A | 1/1987 | Truckenbrodt |
| 4,726,196 A | 2/1988 | Zajic |
| 4,880,342 A | 11/1989 | Pradovic |
| 4,884,722 A | 12/1989 | Podd |
| 5,004,286 A * | 4/1991 | Taylor, III et al. ......... 296/24.1 |
| 5,054,295 A * | 10/1991 | Goulooze ................... 296/24.1 |
| 5,069,497 A * | 12/1991 | Clelland .................... 296/24.1 |
| 5,129,235 A | 7/1992 | Renken et al. |
| 5,161,848 A * | 11/1992 | Lutton ....................... 296/24.1 |
| 5,236,390 A * | 8/1993 | Young ....................... 296/24.1 |
| 5,704,676 A * | 1/1998 | Hill ............................ 296/24.1 |
| 5,769,704 A * | 6/1998 | Henning et al. ............. 454/118 |
| 5,807,046 A | 9/1998 | Onken |
| 5,947,812 A * | 9/1999 | Henning et al. ............. 454/118 |
| 5,993,310 A * | 11/1999 | Onken ........................ 410/129 |

FOREIGN PATENT DOCUMENTS

GB 222453 * 8/1990 ................ 410/121

OTHER PUBLICATIONS

Thermo King Parts Bulletin 1244, dated Dec. 19, 1997.

* cited by examiner

Primary Examiner—Joseph D. Pape
Assistant Examiner—Kiran B. Patel
(74) Attorney, Agent, or Firm—Michael Best & Friedrich LLP

(57) ABSTRACT

An air return bulkhead comprising a first bulkhead portion and a second bulkhead portion joined by a convoluted hinge member. The hinge permits the bulkhead portions to be moved relative to each other.

20 Claims, 10 Drawing Sheets

AIR RETURN BULKHEAD FOR USE WITH A TRANSPORT TEMPERATURE CONTROL SYSTEM

BACKGROUND OF THE INVENTION

This invention generally relates to an air return bulkhead used in combination with a transport temperature control system to provide the requisite airflow through the conditioned space; and more particularly the invention relates to a transport temperature control system air return bulkhead that includes a first bulkhead section and a second bulkhead section, where each of the bulkhead sections is movable relative to the other bulkhead section.

Temperature control systems for use in trailers are mounted on a trailer which defines a conditioned space, and the air in the conditioned space is maintained at a predetermined desired temperature by the temperature control system which is typically mounted on the front trailer wall or panel. The temperature control system evaporator extends through the front trailer wall and into the conditioned space.

Palletized cargo is loaded into the conditioned space and the evaporator serves to cool and force the conditioned air into the conditioned space and around the palletized load in the manner generally indicated by arrows 150 in FIG. 1. The conditioned air is forced rearwardly out the evaporator, around the back of the load, below the load and back to the front of the trailer.

An air return bulkhead is located at the front of the trailer and is typically attached by rivets or the like to the interior of the front trailer wall behind the temperature control unit. The upper portion of the bulkhead is fitted around the evaporator unit. A seal is formed between the bulkhead and the evaporator and conditioned space wall so that the conditioned space air that is drawn behind the bulkhead is flowed into the evaporator and also air in the conditioned space does not short cycle from the conditioned space to a location behind the bulkhead. In order to achieve the requisite seal between the bulkhead and evaporator unit, during bulkhead installation it is typically necessary to cut away or otherwise remove a portion of the bulkhead in order to fit the bulkhead around the evaporator and form the requisite seal therebetween.

When it is necessary to service the temperature control unit evaporator, the prior art bulkhead must be completely removed or disassembled from its fixed position on the trailer wall. Removal of the bulkhead can be quite time consuming. Additionally, the regular removal and reattchment of the bulkhead to the trailer wall can reduce the integrity of the seals between the bulkhead and evaporator and can weaken the bulkhead or result in cracks developing in the bulkhead. Conditioned space air short cycles through the cracks or gaps in the seals behind the bulkhead. Permitting the short cycling of conditioned space air reduces the effectiveness of the temperature control system.

Prior art bulkheads are large. Therefore, in order to ship the bulkheads to customers, prior art bulkheads are typically manufactured as a single piece and then cut into two or more discrete sections for shipping. When installed, the bulkhead sections are overlayed and fixedly connected by screws or other conventional fasteners. The seam or seams where the bulkhead sections are connected are additional locations where conditioned space air may short cycle back behind the bulkhead.

The foregoing illustrates limitations known to exist in present air return bulkheads. Thus, it is apparent that it would be advantageous to provide an alternative bulkhead design that overcame the limitations set forth above by eliminating the need to remove the bulkhead from the trailer wall in order to service the evaporator and also by eliminating the need to cut the bulkhead into discrete sections in order to ship the bulkhead. Accordingly, a suitable alternative that overcomes the limitations associated with prior art bulkheads is provided including features more fully disclosed hereinafter.

SUMMARY OF THE INVENTION

In one aspect of the present invention, this is accomplished by providing an air return bulkhead comprising a first bulkhead portion and a second bulkhead portion joined by a convoluted hinge member. The hinge permits the portions to be moved relative to each other and may be collapsed for easy shipment, and as a result does not need to be reattached when it is installed in the trailer. Additionally, when servicing the temperature control system is required, only the connection members securing the second bulkhead portion need be removed. Once the fasteners are removed, the second bulkhead portion can be moved away from the trailer wall making it easy for a service technician to service the system.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
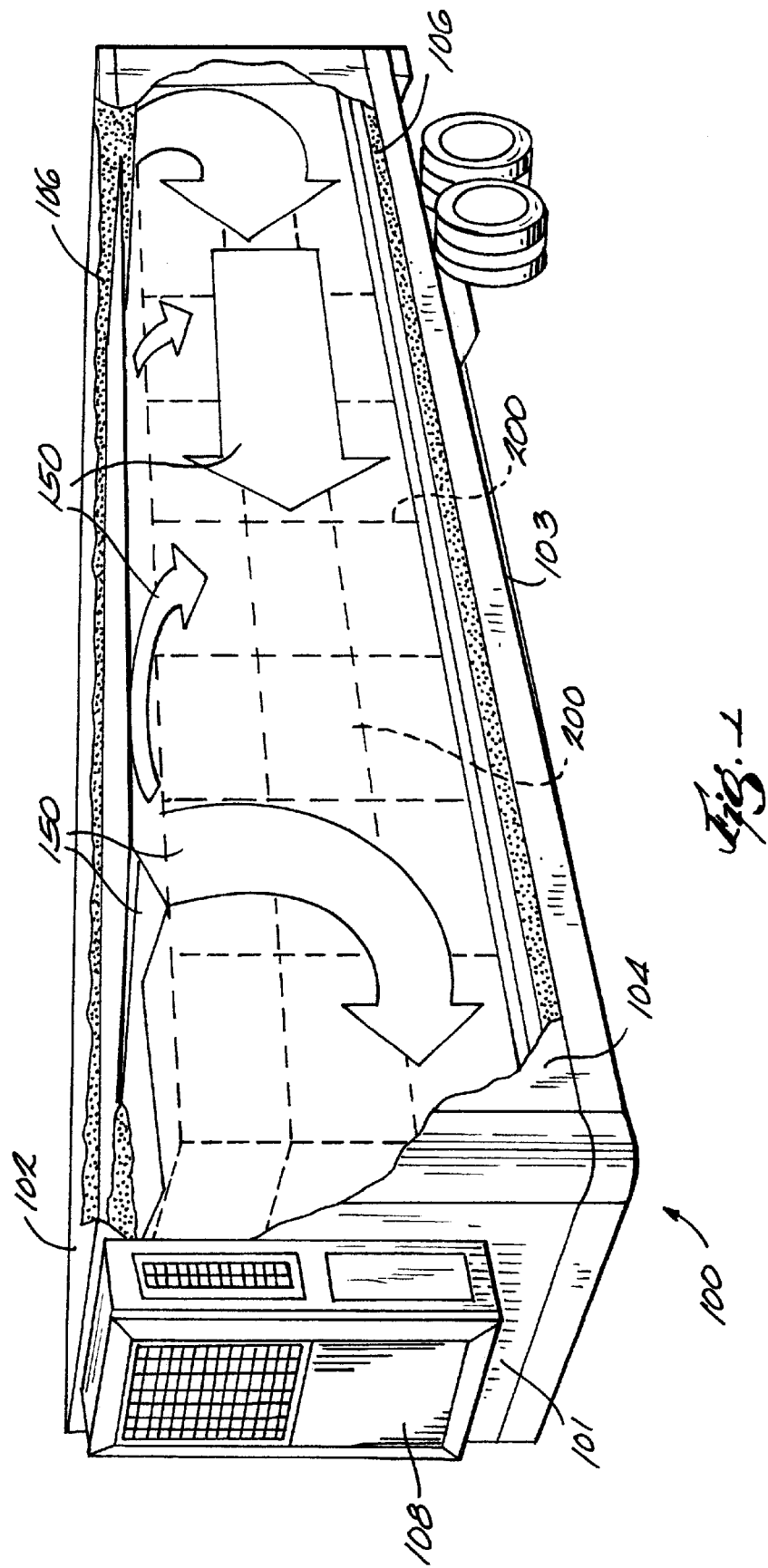
FIG. 1 is a cutaway front perspective view of a trailer with a temperature control unit located on the front end of the trailer.

Turning to the drawing figures wherein like parts are identified by the same numbers throughout the disclosure, FIG. 1 illustrates a conventional trailer 100, that includes front panel 101, top panel 102, bottom panel 103, and side panels 104 and 105 which join the front, top, and bottom panels. The top, bottom, front and side panels define a conditioned space 106 that is maintained at a predetermined required temperature by a temperature control system 108 mounted along the exterior of the front panel 101. The temperature control unit 108 is of conventional design well known to one skilled in the art and includes a conventional evaporator heat exchanger 110 that extends through the front panel 101 and into the conditioned space 106. See FIG. 2.

A palletized load 200 is loaded in the conditioned space 106 so that conditioned air flows outward from the evaporator and around the load in the direction of arrows 150 in FIG. 1 through spaces between the load 200 and the trailer panels 101, 102, 103, 104, 105 and rear trailer doors which are not illustrated. The conditioned air travels from the front of the trailer around the load to the rear of the trailer and returns to the front of the trailer where the air is again flowed through the evaporator. The return air passes behind the bulkhead of the present invention before flowing into the evaporator.

Now turning to the air return bulkhead of the present invention 10, as shown in FIGS. 2–10, the air return bulkhead is located in conditioned space 106 and is attached to the inside portion of the front trailer wall 101 behind the temperature control unit. The upper portion of the bulkhead 10 is adapted to be fitted around evaporator 110 so that return conditioned air flows between the bulkhead and trailer wall 101, and into the evaporator. The air is then returned to the conditioned space 106 as it flows out of the evaporator discharge opening. The manner of attaching the bulkhead to the front wall and fitting the bulkhead around the evaporator unit will be discussed in further detail hereinbelow.

For purposes of describing the preferred embodiment of the invention, bulkhead 10 has a unitary body that is comprised of a molded plastic material which is preferably polyethylene. Bulkhead 10 includes first bulkhead portion 12 and second bulkhead portion 14 which are joined by a connection member 16. As the description proceeds, the first bulkhead portion 12 may also be referred to as the inlet bulkhead portion, and the second bulkhead portion 14 may also be referred to as the discharge bulkhead portion.

Although bulkhead 10 is shown and described as unitary, it should be understood that first and second bulkhead portions 12 and 14 could be comprised of discrete members that are made integral by a discrete connection member 16.

Figure 6:
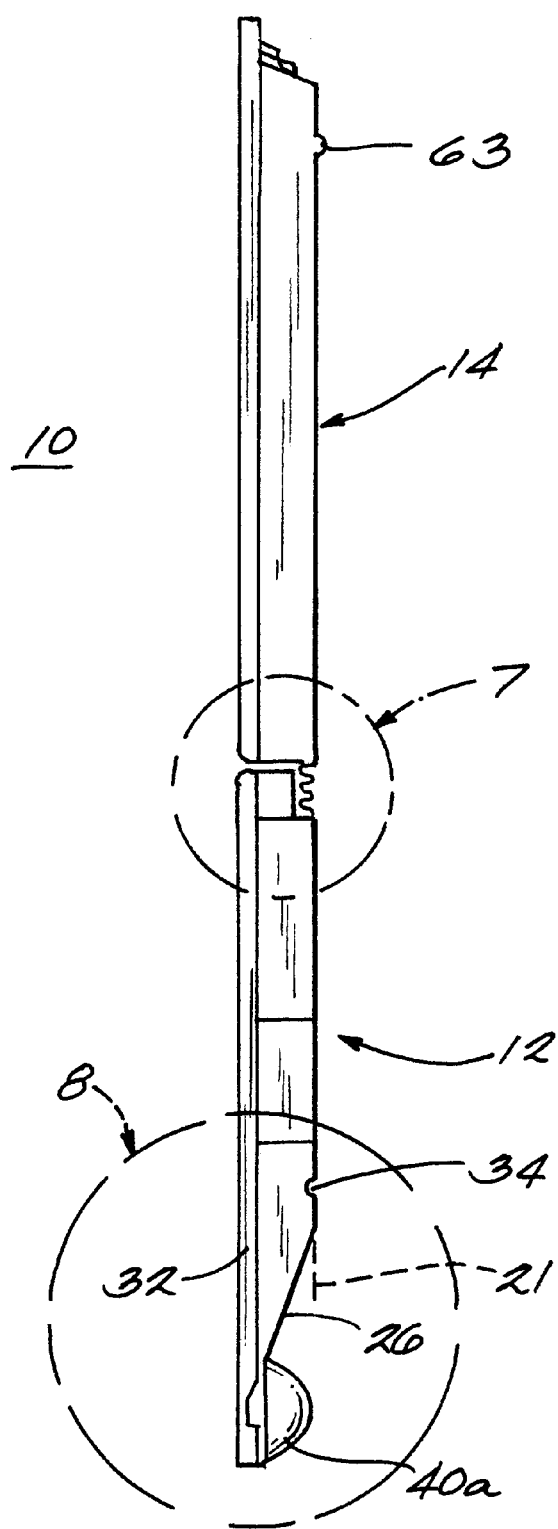
FIG. 6 is a left side view of the bulkhead shown in FIG. 3.

The first bulkhead portion includes a front wall 20 which defines a first plane 21, side walls 22 and 24, and an inlet wall 26 which joins walls 20, 22, and 24. As shown in FIG. 6, the inlet wall 26 is angled inwardly as it extends downwardly from the front wall 20. By angling inlet wall 26 in this manner, the conditioned space return air is more efficiently returned to the evaporator 110 through the return air inlet openings 30 that are provided along the inlet wall 26. As shown in the Figures, the inlet openings are comprised of a plurality of slots arranged side-by-side along the inlet wall. As shown in the rear view illustrated in FIG. 3, each inlet opening 30 includes a standing circumferential rib 31. The ribs are provided along the rear of the openings 30 and serve to stiffen the free edges of the openings.

Flange 32 is provided along the free edges of the walls 22, 24, and 26. The flange 32 is placed against the trailer wall during bulkhead installation and provides the surface area necessary to form the seal between the bulkhead and trailer wall 101 when the bulkhead is in use.

Now turning to FIGS. 3, 4, and 5, the bulkhead 10 includes molded support columns 36a–d, 38a–d along the front wall 20 below connection member 16. The support columns are arranged into one array of laterally aligned upstream support columns 36a, 36b, 36c, and 36d; and one array of laterally aligned downstream support columns 38a, 38b, 38c, and 38d. Each column includes an access opening 40, a closed end 42 coplanar with flange 32, and wall 44 extending between the access opening and the closed end. The wall 44 of each column is tapered inwardly as each support column wall extends from the respective access opening to the closed column end.

Figure 3:
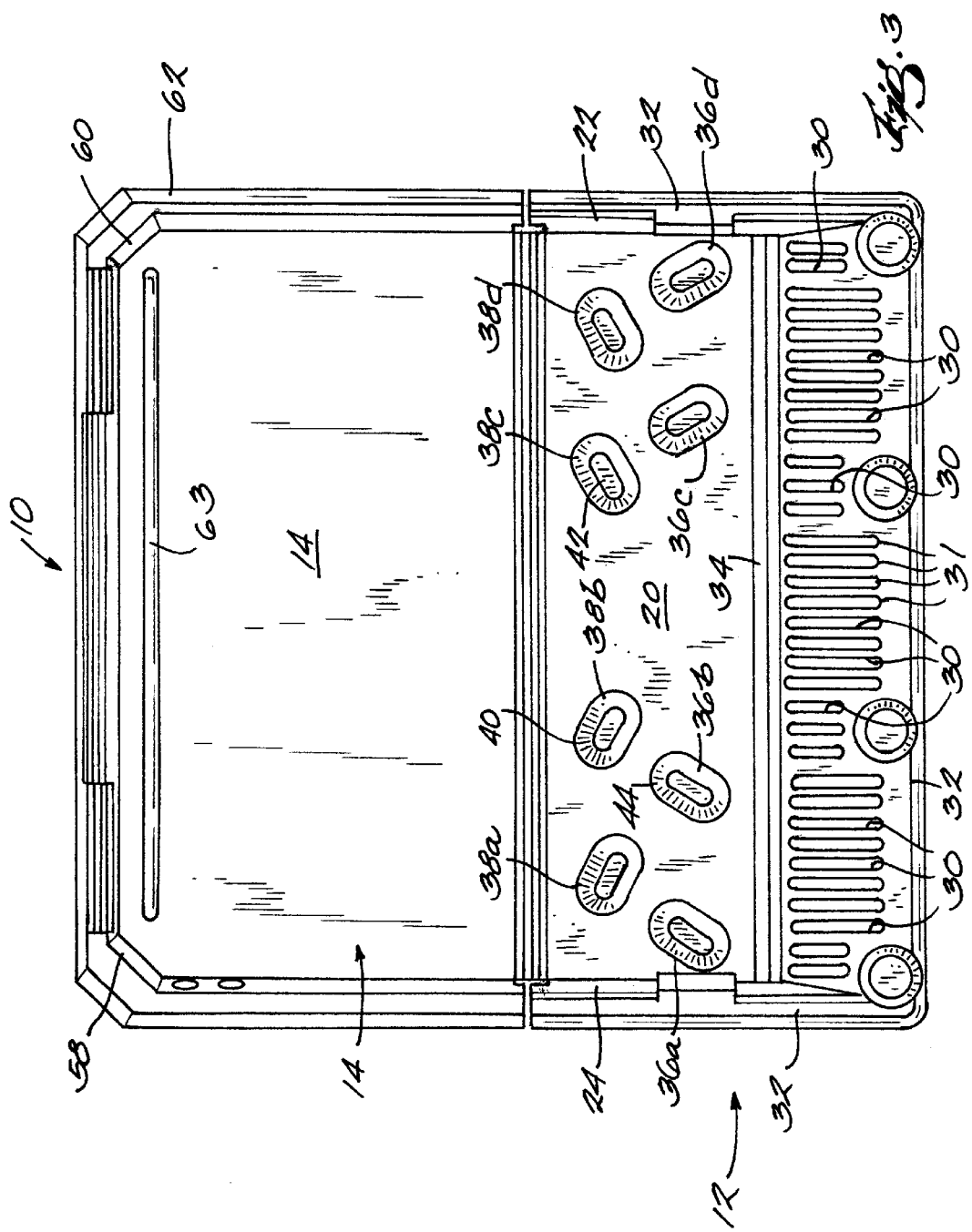
FIG. 3 is a rear plan view of the bulkhead shown in FIG. 2.

As shown in FIG. 3, the upstream support columns 36a–d are directed upwardly and inwardly toward the middle of the bulkhead in the direction 201 of flow of return air through the bulkhead. The downstream support columns 38a–d are directed upwardly and outwardly away from the center of the bulkhead in the direction of flow 201 through the bulkhead. In this way, corresponding adjacent upstream and downstream support columns for example 36a, 38a; 36b, 38b; 36c, 38c; and 36d, 38d; are oriented in opposite directions and are substantially perpendicular. See FIG. 4. Grouping and orienting the support columns in this manner creates turbulent air flow through the bulkhead and as a result the air flow mixes thoroughly so that the air returned to the evaporator 110 has a temperature that is substantially constant for the entire volume of return air. Prior art bulkheads do not create sufficient turbulence to thoroughly mix air and create temperature distribution across the evaporator.

When the bulkhead is installed in a trailer conditioned space 106, the closed support column faces 42 and base 12 are butted against front trailer panel 101. The elongated shape of the columns allows a technician installing the bulkhead to easily insert a standard tool, such as an air powered rivet gun, into the open column to drive at least one fastener through the closed column face 42 and panel 101. The support columns overlay trailer wall 101 support members so that when fasteners are passed through ends 42, they are driven into the wall support members.

For purposes of describing the preferred embodiment of the invention four support columns are shown and described however it should be understood that any suitable number of upstream and downstream support columns may be included in bulkhead 10.

Four pallet stops 40a, 40b, 40c, and 40d are provided on the first bulkhead portion along the flange 32 and inlet wall 26. Each pallet stop has a frustoconical body with an apex respectively referred to as 42a, 42b, 42c, and 42d. The apex of each pallet stop is the point on each pallet stop located the greatest outward distance from the flange 32. Unlike other prior art bulkheads, the pallet stops do not extend downward from the panel 12 and are not coplanar with plane 21. Rather, the pallet stops are discrete members with apexes that extend beyond plane 21. The four pallet stops impede the forward movement of pallets 200 as they are placed on the bottom trailer panel 103 and also the cargo as it is placed on the pallets. In this way, the air flow to the inlet openings 30 is not blocked.

An elongate strengthening recess 34 is located on the wall 20, adjacent inlet wall 26. The recess extends between sidewalls 22 and 24 and serves to strengthen the bulkhead first portion and prevent bulkhead buckling or cavitation.

The second bulkhead portion 14 includes a front wall 50, sidewalls 52 and 54 and top wall 56. Angled walls 58 and 60 join the sidewalls and top wall 56. Flange 62, like flange 32 is included along the free edges of the walls 52, 54, 56, 58, and 60 and serves to produce the required seal with trailer wall 101.

Figure 4:
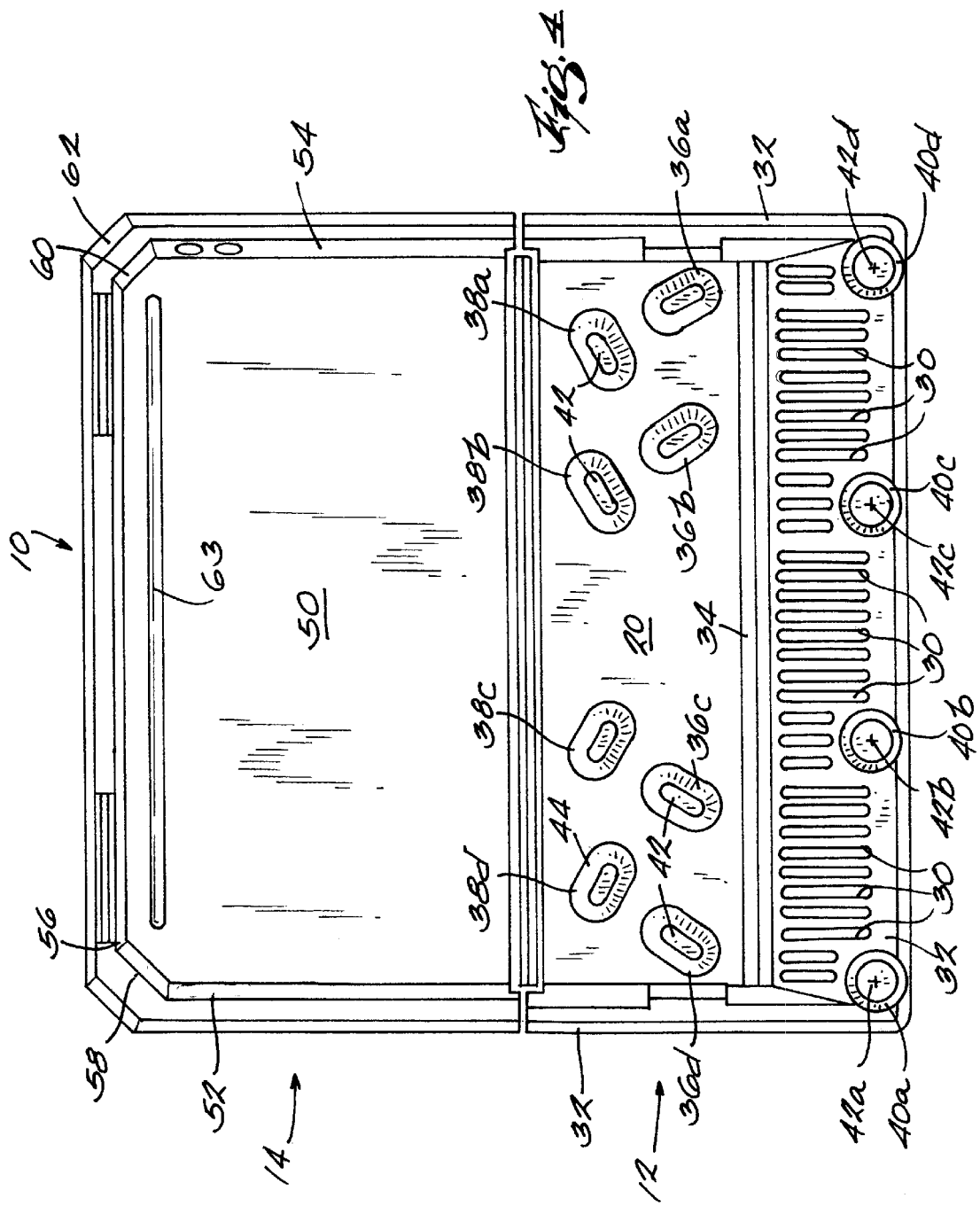
FIG. 4 is a front plan view of the bulkhead shown in FIG. 3.
Figure 5:
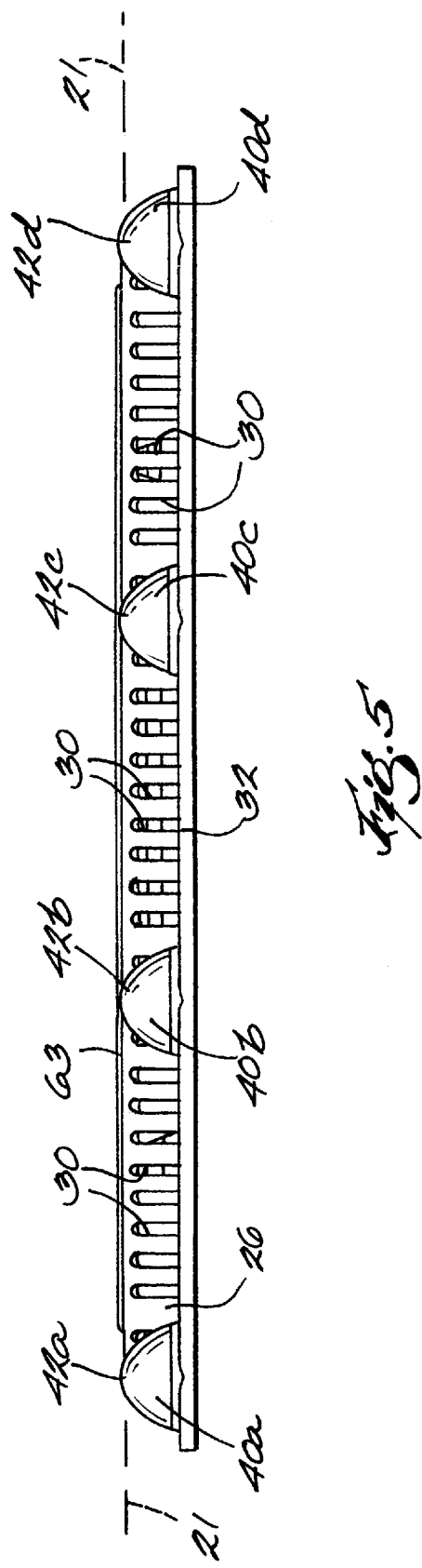
FIG. 5 is bottom view of the bulkhead shown in FIG. 3.

As shown in FIG. 4, raised rib 63 extends along the upper portion of wall 50 adjacent walls 56, 58, and 60; and serves to strengthen the discharge bulkhead portion.

Figure 2:
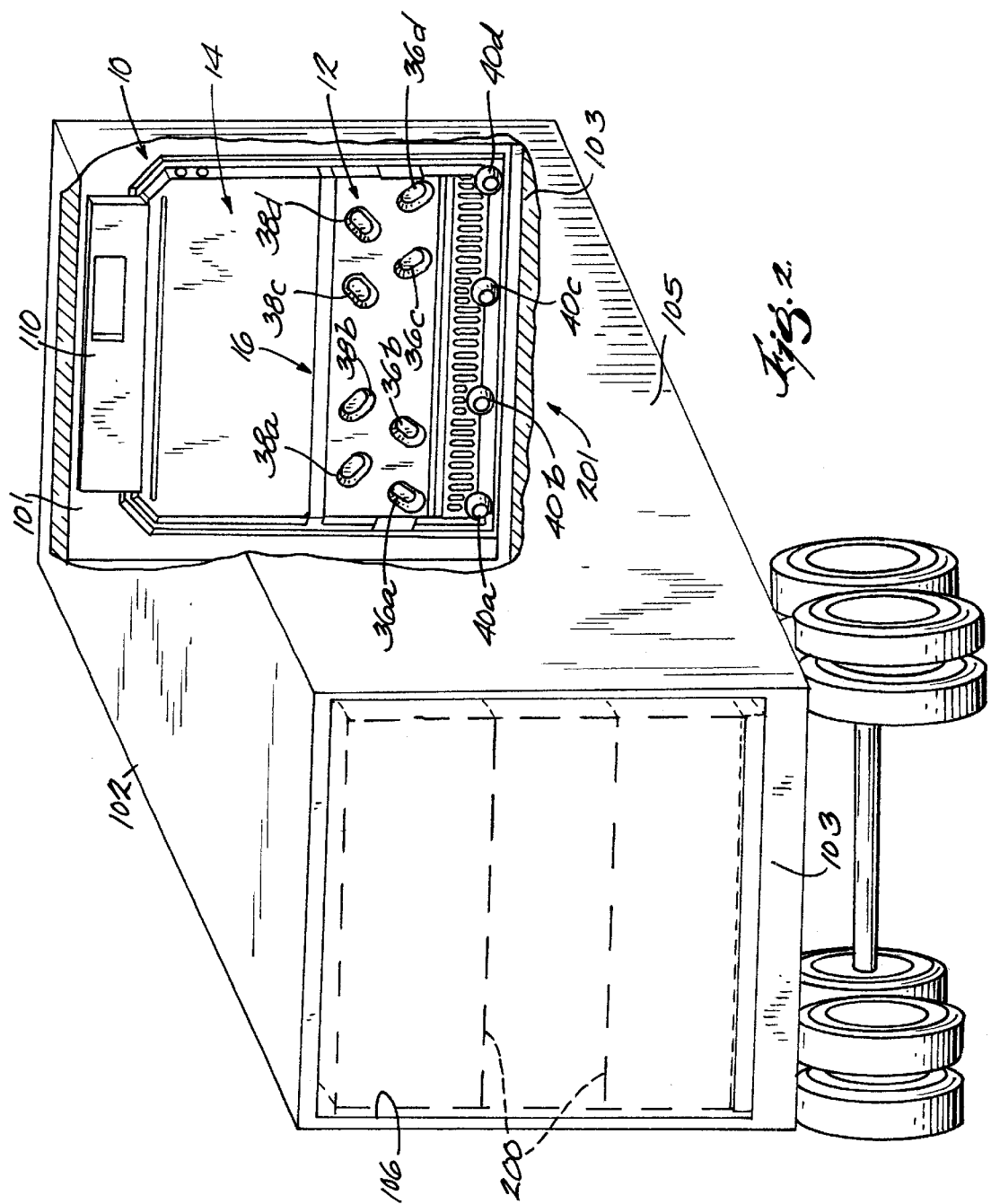
FIG. 2 is a rear perspective view of the trailer of FIG. 1 with a portion of the trailer cut away to show the bulkhead of the present invention mounted on the front trailer wall behind the temperature control unit.

Top wall 56 includes a plurality of steps 64. The steps are formed with middle step portion 64a having a height that is greater than side step portions 64*b* and 64*c*. As shown in FIG. 2, the steps are designed to act as an aide in making a cut out for the refrigeration unit evaporator to fit the bulkhead around the evaporator unit. The steps also act as stiffening ribs which support the area around the cutout portion of the steps and top wall.

Figure 7:
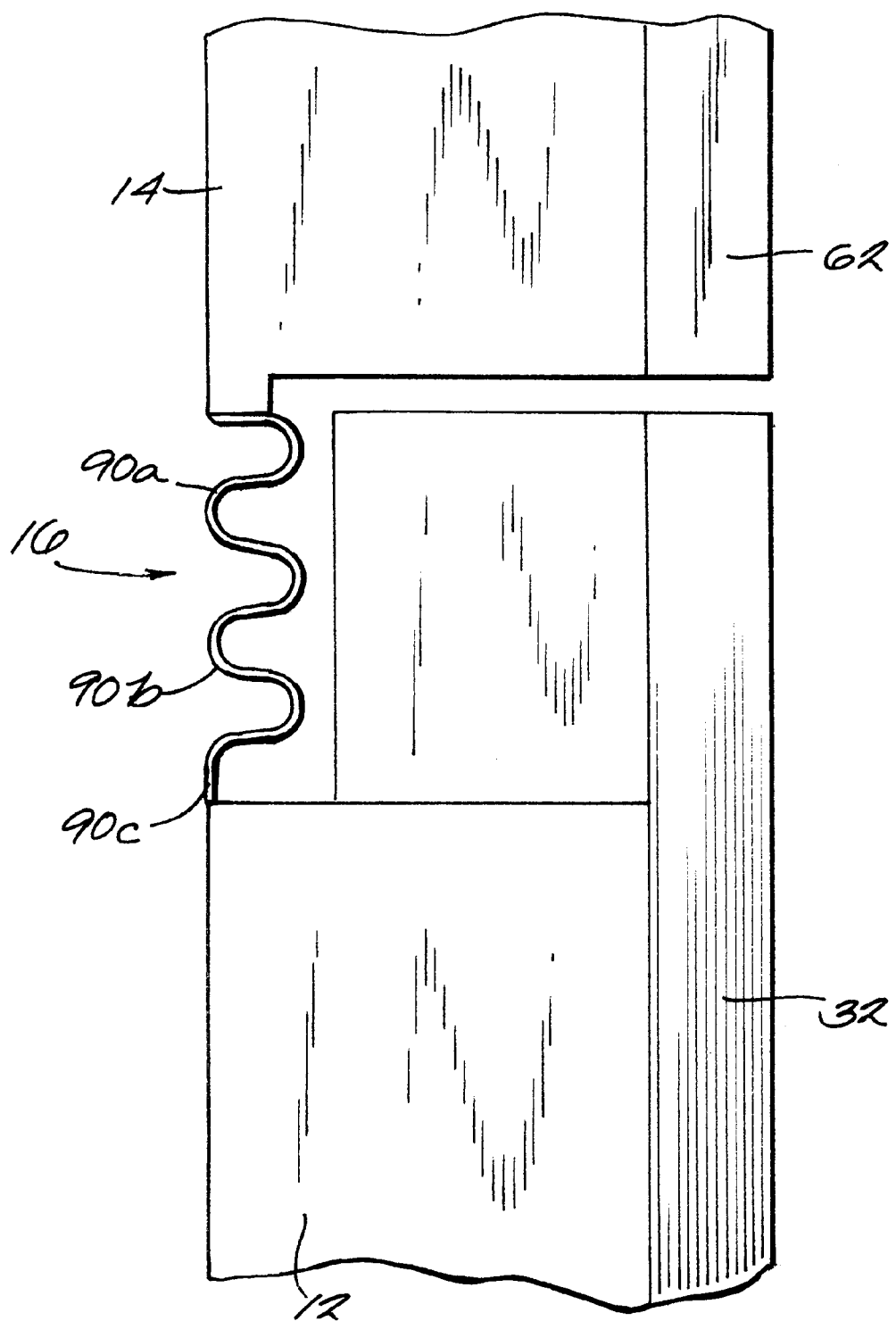
FIG. 7 is an enlarged view of the bulkhead connection member (encircled) portion of FIG. 6.
Figure 8:
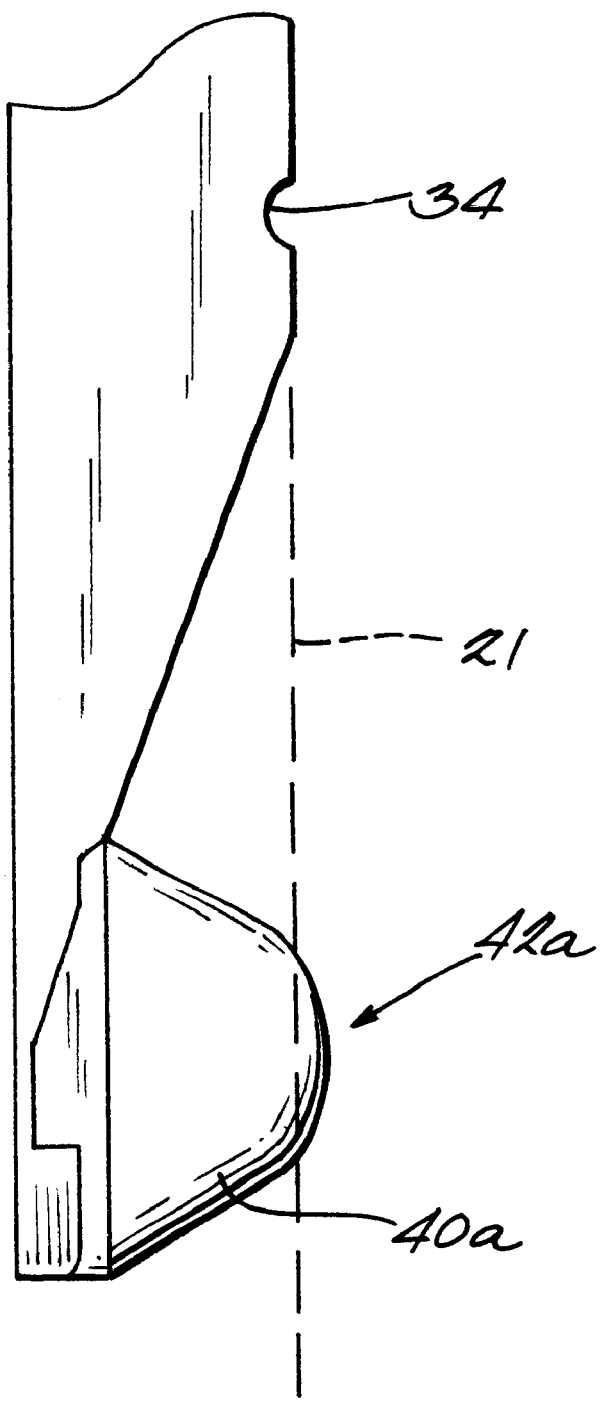
FIG. 8 is an enlarged view of the bulkhead stop member portion (encircled) of FIG. 6.

The first and second bulkhead sections are made integral by a connection member 16 which is comprised of a convoluted hinge. The hinge permits the portions 12 and 14 to be moved relative to each other. As shown in FIG. 7, the hinge is comprised of a number of elongated convolutions 90*a*, 90*b*, and 90*c* that are oriented perpendicular to the direction the hinge bends and in this way, the thickness of the hinge is minimized while the effective length of the hinge is maximized and thereby increasing the effective length of the hinge and causing the hinge to flex easily. The convolutions are arranged so that each pair of adjacent convolutions defines a valley 92. The hinge permits easy movement of the bulkhead sections about the hinge.

Figure 9:
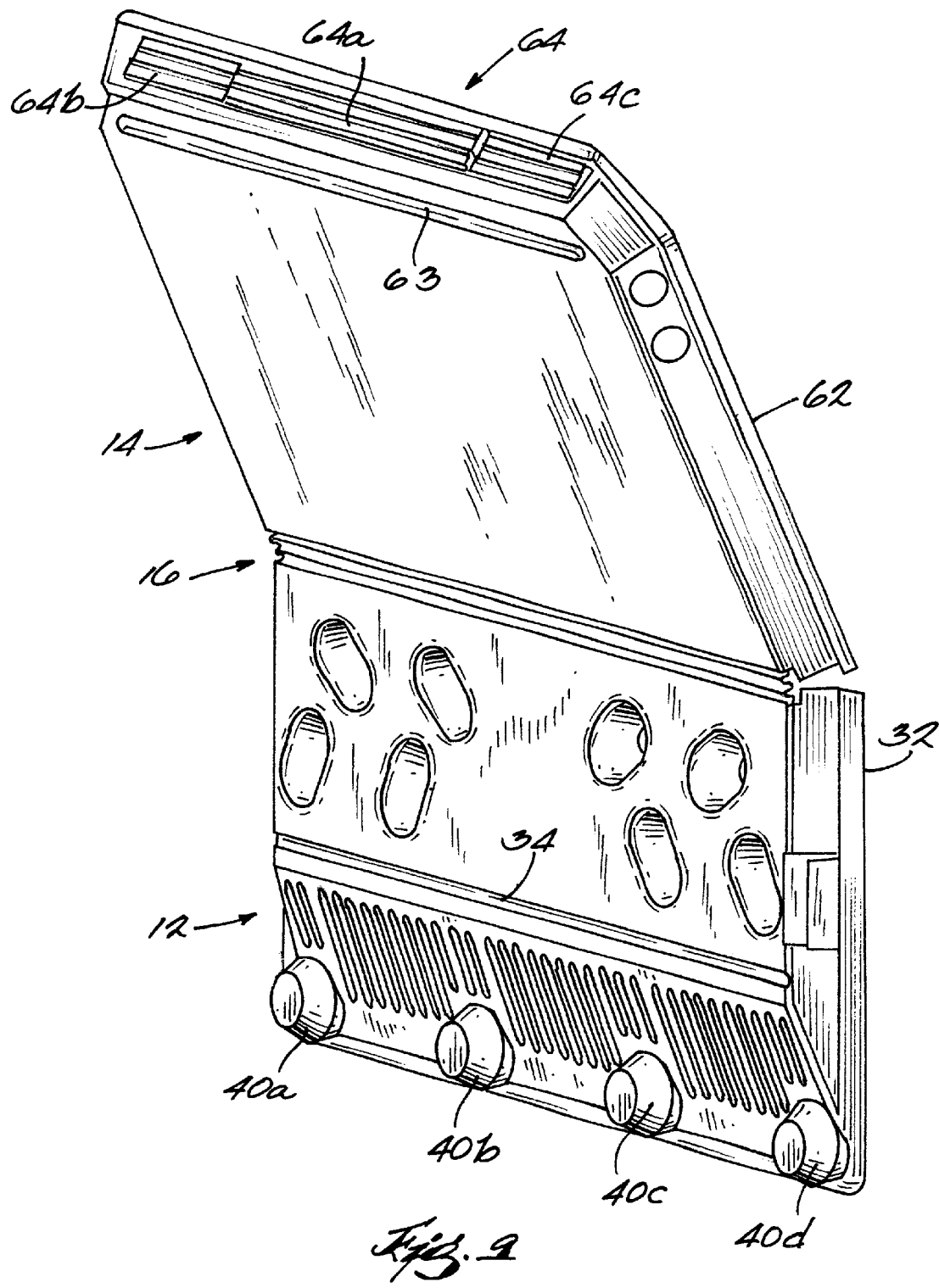
FIG. 9 is a perspective view of the bulkhead shown in FIG. 3 with one bulkhead section moved relative to the other bulkhead section.
Figure 10:
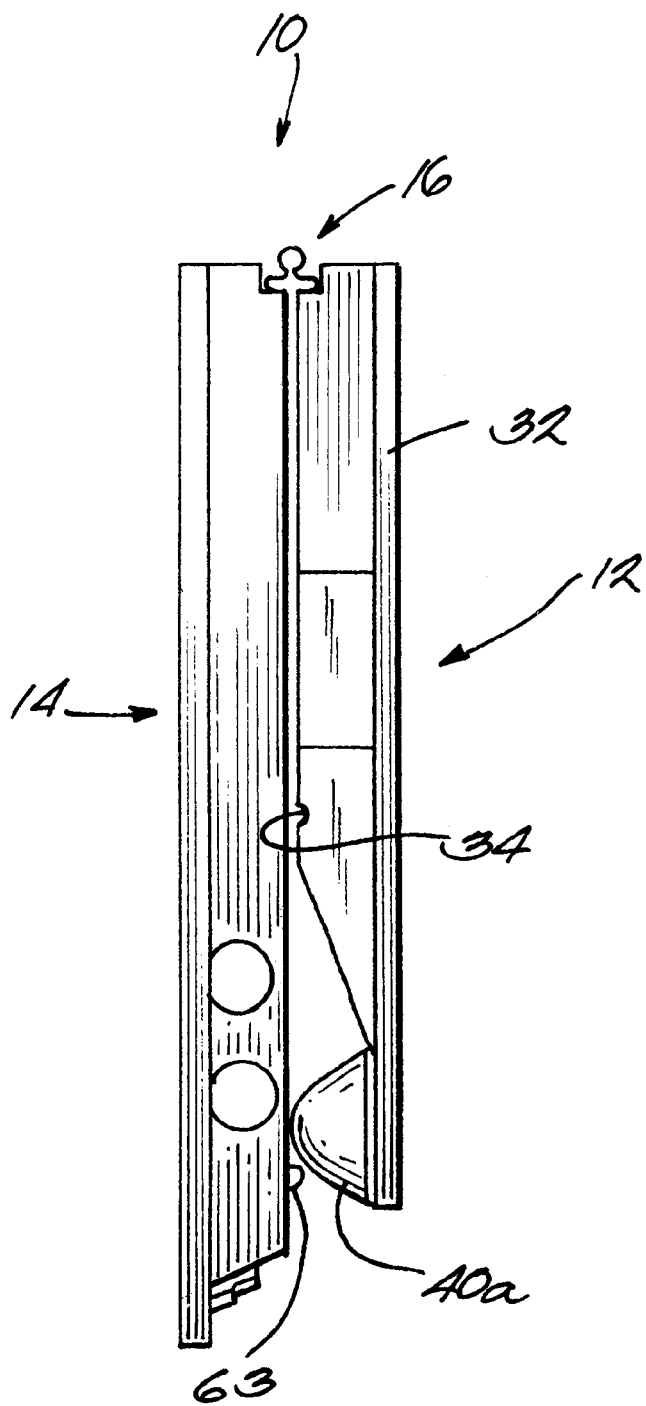
FIG. 10 is a right side view of the bulkhead of FIG. 9 showing the bulkhead portions moved together.

As shown in FIG. 9, when it is necessary to service or repair the temperature control unit, the fasteners only need to be removed from the bulkhead portion 14, and then once the fasteners are removed the bulkhead portion can simply be moved away from the bulkhead wall 101 making it easy for the service technician to access the system components requiring servicing such as the evaporator. Additionally, the bulkhead of the present invention does not need to be cut and reattached in order to effectively be shipped. Rather, as shown in FIG. 10, the bulkhead portions can simply be folded about the hinge and brought together for easy shipment. Upon arrival at the purchaser, the halves are simply moved apart and extended for installation to the orientation of FIGS. 3 and 4. In this way the bulkhead of the present invention helps to maintain the integrity of the bulkhead.

While we have illustrated and described a preferred embodiment of our invention it is understood that this is capable of modification, and we therefore do not wish to be limited to the precise details set forth, but desire to avail ourselves of such changes and alterations as fall within the purview of the following claims.

Having described the invention, what is claimed is:

1. An air return bulkhead for use in a trailer having a temperature control system, the air return bulkhead comprising: a first bulkhead section, a second bulkhead section, the first and second bulkhead sections being joined by a connection member, each bulkhead section being movable relative to the other bulkhead section to facilitate access to the temperature control system when the air return bulkhead is mounted in the trailer.

2. The air return bulkhead as claimed in claim 1 wherein the connection member is a hinge.

3. The air return bulkhead as claimed in claim 2 wherein the hinge is comprised of at least one convolution.

4. The air return bulkhead as claimed in claim 2 wherein the hinge is comprised of a plurality of elongated convolutions.

5. The air return bulkhead as claimed in claim 1 wherein the first bulkhead section defines a plane, the first bulkhead section including conditioned space return air inlets; the air return bulkhead also including at least one pallet stop, the at least one pallet stop having an apex that is located outside the plane defined by the first bulkhead section.

6. The air return bulkhead as claimed in claim 5 wherein the at least one pallet stop is frustoconical.

7. The air return bulkhead as claimed in claim 1 wherein the first bulkhead section has a panel that defines a plane, the air return bulkhead further comprising a plurality of stop members that are located away from the panel, the stop members having apexes that are located beyond the plane.

8. The air return bulkhead as claimed in claim 7 wherein the stop members are frustoconical.

9. The air return bulkhead as claimed in claim 1 wherein the bulkhead is unitary.

10. The air return bulkhead as claimed in claim 1 wherein the first bulkhead section and second bulkhead section are discrete members made integral by the connection member.

11. A combination comprising:
 a) a trailer that defines a conditioned space, the trailer having a front wall;
 b) a temperature control system mounted on the front wall, the temperature control system including evaporator means that extends into the conditioned space; and
 c) an air return bulkhead located on the front wall in the conditioned space, the air return bulkhead having a first bulkhead section that includes conditioned space return air inlets; a second bulkhead section that partially surrounds the evaporator portion in the conditioned space; and a connection member joining the first and second bulkhead sections, the connection member permitting each bulkhead section to be movable relative to the other section.

12. The combination as claimed in claim 11, the first bulkhead section having a first panel which defines a plane in the conditioned space, the bulkhead further comprising a plurality of stop members having apexes, the stop members extending into the conditioned space with the stop member apexes located outside the plane defined by the first panel.

13. An air return bulkhead comprising: a first bulkhead section that includes conditioned space return air inlets and at least one pallet stop, a second bulkhead section, and a connection member joining the first and second bulkhead sections, the connection member permitting each bulkhead section to be movable relative to the other bulkhead section.

14. The air return bulkhead as claimed in claim 13 wherein the first bulkhead section defines a plane and wherein the at least one pallet stop has an apex that is located outside the plane defined by the first bulkhead section.

15. The air return bulkhead as claimed in claim 13 wherein the at least one pallet stop is frustoconical.

16. The air return bulkhead as claimed in claim 13 wherein the connection member is a hinge.

17. The air return bulkhead as claimed in claim 16 wherein the hinge is comprised of at least one convolution.

18. The air return bulkhead as claimed in claim 16 wherein the hinge is comprised of a plurality of elongated convolutions.

19. The air return bulkhead as claimed in claim 13 wherein the bulkhead is unitary.

20. The air return bulkhead as claimed in claim 13 wherein the first bulkhead section and the second bulkhead section are discrete members made integral by the connection member.

* * * * *